United States Patent [19]
Parry

[11] Patent Number: 6,148,331
[45] Date of Patent: Nov. 14, 2000

[54] DESTINATION WEBSITE ACCESS AND INFORMATION GATHERING SYSTEM

[76] Inventor: Rhys Evan Parry, 3410 Xerxes Ave. North, Minneapolis, Minn. 55412

[21] Appl. No.: 08/845,670

[22] Filed: Apr. 25, 1997

[51] Int. Cl.[7] ............................ H04N 7/173; G06F 15/00
[52] U.S. Cl. ............................... 709/218; 283/70; 705/14
[58] Field of Search ............................ 235/375; 705/14, 705/26, 27; 283/70; 709/245, 217, 218

[56] References Cited

U.S. PATENT DOCUMENTS

| | | | |
|---|---|---|---|
| 5,288,976 | 2/1994 | Citron et al. | 235/375 |
| 5,304,786 | 4/1994 | Pavlidis et al. | 235/462.07 |
| 5,331,547 | 7/1994 | Lazslo | 705/2 |
| 5,418,713 | 5/1995 | Allen | 705/32 |
| 5,496,071 | 3/1996 | Walsh | 283/70 |
| 5,640,193 | 6/1997 | Wellner | 348/7 |
| 5,649,186 | 7/1997 | Ferguson | 707/10 |
| 5,671,282 | 9/1997 | Wolff et al. | 713/179 |
| 5,710,887 | 1/1998 | Chelliah et al. | 705/26 |
| 5,745,146 | 4/1998 | Durst et al. | 347/192 |
| 5,745,681 | 4/1998 | Levine et al. | 709/200 |
| 5,757,917 | 5/1998 | Rose et al. | 705/79 |
| 5,765,176 | 6/1998 | Bloomberg | 707/514 |
| 5,778,367 | 7/1998 | Wesinger, Jr. et al. | 707/110 |
| 5,791,991 | 8/1998 | Small | 463/41 |
| 5,804,803 | 9/1998 | Cragun et al. | 235/375 |
| 5,848,413 | 12/1998 | Wolff | 707/10 |
| 5,869,819 | 2/1999 | Knowles et al. | 235/375 |
| 5,933,829 | 8/1999 | Durst et al. | 707/10 |

FOREIGN PATENT DOCUMENTS

| | | |
|---|---|---|
| WO 97/01137 | 1/1997 | WIPO . |
| WO 98/24036 | 6/1998 | WIPO . |
| WO 98/24050 | 6/1998 | WIPO . |
| WO 98/40823 | 9/1998 | WIPO . |
| WO 98/49813 | 11/1998 | WIPO . |

OTHER PUBLICATIONS

IBM Technical Disclosure Bulletin "Distributing Uniform Resource Locators as Bar Code Images", XP 000556360, Jan. 1996, v.39, No. 01, pp. 167.

Koda et al. "Ubiquitous Advertising on the WWW: Merging Advertisement on the Browser", Computer Networks and ISDN System, (1996), pp. 1493–1499.

*Primary Examiner*—Dung C. Dinh
*Attorney, Agent, or Firm*—Oppenheimer Wolff & Donnelly LLP; Daniel G. Chapik

[57] ABSTRACT

A destination website access system employs a bar code reader cooperating with a personal computer or workstation for accessing a unique destination website through a remote Internet service provider (ISP). The address of the unique destination website is embedded within a visibly displayed bar code on a visible medium. In turn, the bar code on the visible medium is scanned and the workstation automatically connects the workstation to the destination website. An intermediary website stores (for further usage) the identities of (i) the workstation; (ii) the visible medium; and/or (iii) the destination website.

13 Claims, 2 Drawing Sheets

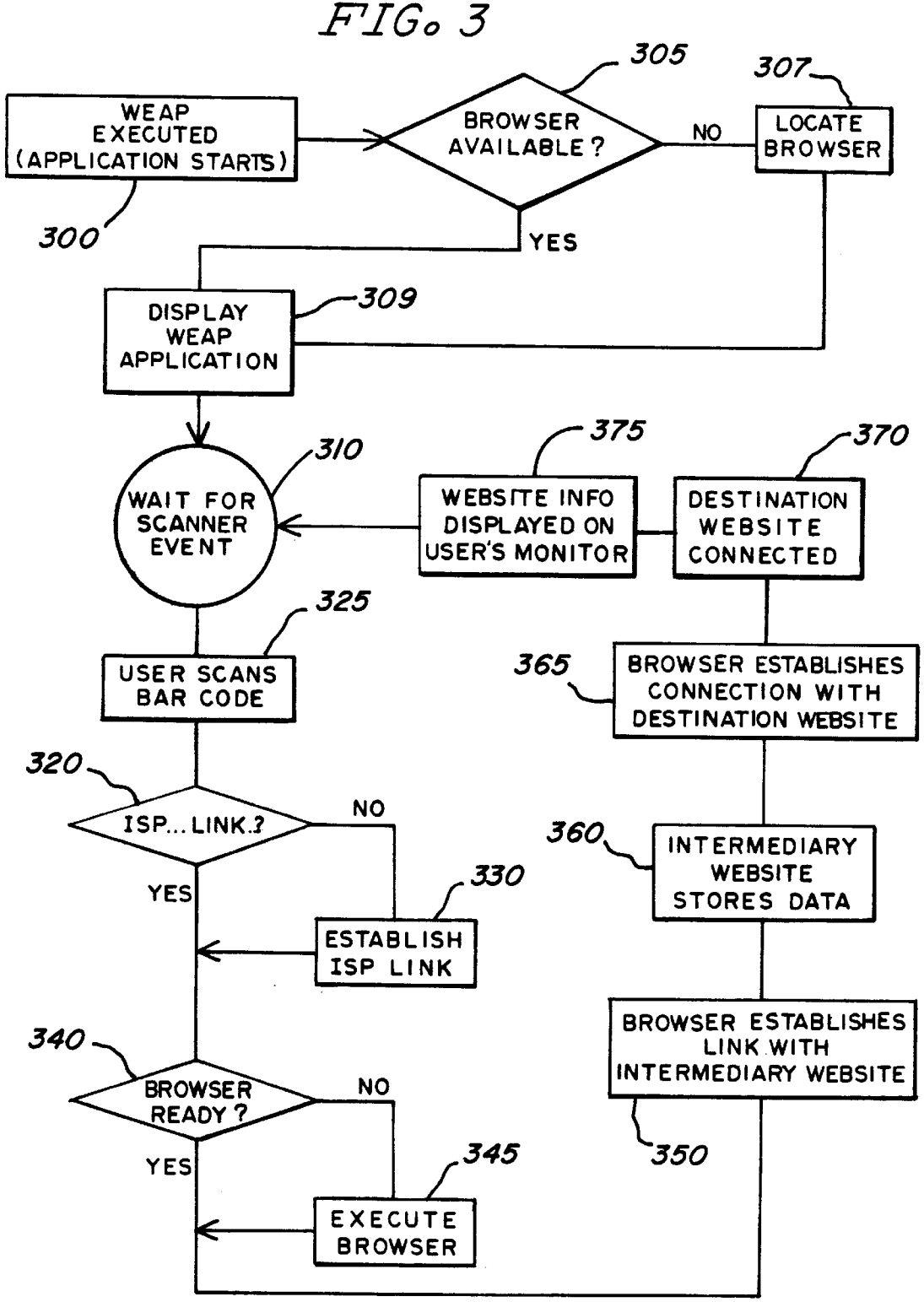

DESTINATION WEBSITE ACCESS AND INFORMATION GATHERING SYSTEM

FIELD OF THE INVENTION

The present invention relates generally to a system for a computer user to access a destination website, and more particularly to a system for interpreting a printed bar code on a visible medium (e.g. a specific advertisement in a specific newspaper) enabling user access to and communication with the destination website as dictated by the bar code. The present invention is particularly suited for use in conjunction with the extremely large-area network computer accessing system commonly referred to as the "Internet."

The present invention facilitates, simultaneously, two important results or functions. First, the computer user is provided a rapid means for receiving information from a specific Internet "website" even though, importantly, the user may not be aware of the website address or URL (Universal Resource Locator).

The second important result or function of the present invention is that, in addition to the above-described information supplied to the user, a separate body of information is stored to be available for use by the publisher of the aforesaid visible medium, and/or third parties, such information including (i) the identity of the computer user; (ii) the specific "publication" on which the bar code was imprinted; and (iii) the destination website address (URL).

BACKGROUND OF THE INVENTION

The Internet is accessed world-wide by millions of users every day, for both business and pleasure. Internet access provides a user with connections, typically via a local telephone line, to computers and associated databases around the world, thereby promoting a rapid exchange of messages and other information.

Internet accessibility is particularly advantageous because of information delivery to users through the use of low-cost connections to other computers through local phone lines, which access heretofore would have been only possible through long-distance telephone connections or through physical transfer of data through, for example, "hard copy" printed material, computer diskettes, or the like.

One of the primary advantages of the Internet is rapid world-wide information research and access at the user's "finger tips" regarding virtually any subject. Some examples, among many others, include patent searching, stock and other financial information, newspapers, book reviews, medical research, automobile shopping, movie theater schedules, movie clips, sound clips, and entertainment reviews.

A common Internet search scenario consists of sequential steps conducted by the user as follows:

1. The user contacts, via a local phone line, an ISP (Internet Service Provider) through a telephone modem dialing program so that the user's workstation or personal computer (PC) establishes a communication link with the ISP;
2. A "browser" application program, e.g., Netscape$^{SM}$, is executed on the user's PC;
3. A connection to an Internet "search engine" website, e.g., Yahoo$^{SM}$, Web Crawler$^{SM}$, Infoseek$^{SM}$, and the like, is executed by the user through the browser, thereby establishing a connection between the user's PC and the search engine website;
4. Once the search engine website connection is made, a search engine input screen is then displayed on the user's PC monitor while the search engine is idle in an "input wait mode";
5. A search strategy in the form of key word search terms is provided by the user as textual input to the search engine on the search engine input screen through the PC's keyboard;
6. In turn, the search engine awaits a "finished" input command from the user in the form of a mouse click of an icon control button or alternatively a stroke of the "enter" key on the keyboard;
7. The user's search strategy request is then delivered onto the world-wide web through the search engine;
8. A list of Internet websites (search hits or citations) and corresponding URLs (Universal Resource Locators) or website addresses are received and displayed on the user's monitor; and
9. The user may then select a particular URL of interest by a "mouse click" which causes information associated with the URL to be subsequently retrieved and displayed for digestion by the user, and for further inquiries.

Alternatively to the foregoing scenario, if the URL or "website address" is known, the above steps 3 through 9 may be replaced by entering the website address into a URL input line of the browser for subsequent "direct" connection to the website and subsequent retrieving of the information associated therewith. Furthermore, steps 1 and 2 may also be reversed, i.e., the browser application, once executed, may then call up the dialing program.

Unfortunately, research on the Internet can be tedious and time consuming. This is so, since common searches on the Internet through a variety of "search engines" are indiscriminate regarding the "search hits" or citations. For example, tens of thousands of citations may be the result of a search. Further, duplicate search results may also be retrieved because of the particular search engine techniques employed.

Furthermore, as is common on the Internet, a website commonly referred to as the "home page" generally may contain hundreds of pages of information, each having its own website stemming from their home page website address, i.e., having a common root URL plus an extension name. Metaphorically, it's like a hotel having 40 floors and each floor has 40 rooms. The user, in many instances, desires only the information about a specific room at the hotel. Without prior knowledge of the "room number" it is very time consuming for the user to access the room of interest. Herein, the "room number" is referred to as the desired "destination website address.

Readers of the visual published media, such as newspapers, magazines, advertising catalogs or brochures, videos, television, or the like, may have a desire to obtain further information associated with a particular published article, advertisement, or the like, and frequently there is available, somewhere on the Internet, such further information. However, it can be difficult and is usually time consuming to access the desired information from the Internet. Thus, there exists a need for a rapid Internet destination website accessing system for obtaining supplemental information directly related to an observed or visited published article, advertisement, or publication. At the same time, there is a strong need for the publisher, advertiser, or article writer to have information regarding the specific inquirer of the information.

To explain, it has long been a frustration for advertisers and publishers, because of a lack of specific information regarding which readers or observers (if any) of an advertisement were sufficiently interested in the item(s) advertised so that they took some action (or would like to take some action) to obtain more information about the item(s). Publishers, advertisers and advertising agencies routinely expend large sums on surveys and estimates of "readership interest" but these procedures are very expensive and frequently are flawed. Furthermore, the identity of the specific "interested" reader or observer is not determined.

Heretofore, there has not existed a system to rapidly access a destination website corresponding to a visual publication, printed or otherwise visible item, e.g., a visible article or advertisement in a printed media publication, such as a newspaper or magazine, the publication itself, advertising catalogs, jackets for videos and CDs, television, videos, and the like. It thus should be understood that the word "publication" or the term "visual publication" as used herein includes all printed, written and/or graphic communications. In order to ferret out a particular website associated with a visual publication, the reader must either conduct the usual Internet search in the manner as described above, or observe a printed URL somewhere within the contents of the publication by "visually" inspecting the publication to find a recited (printed or displayed) URL Internet destination website address. If the URL Internet destination website address is identified in the publication, the website may be found in the well-known manner including the execution of steps 1–2, and entering the URL website address into the browser's input line via the user's computer keyboard as aforesaid. Of course, this may be a point of error and/or loss of desired information, particularly if there are multiple websites of interest associated with the publication. Further, and of great importance, such a system of accessing the website provides no means of capturing the combined information about (i) the inquirer or user; (ii) the publication "viewed" by the user, i.e., the publication source; and (iii) the destination URL.

SUMMARY OF THE INVENTION

An object of the present invention is to provide a system which provides rapid access to a destination website containing supplemental information relating to a publication of interest.

Another object of the present invention is to provide a system which provides rapid and accurate access to a destination website containing supplemental information relating to a publication of interest, without need for visual inspection of the publication by a user and without need for keyboard URL entry by the user.

Yet another object of the present invention is to automatically record accesses to websites associated with a publication, i.e., (i) the identity of the inquirer or user; (ii) the specific publication "viewed" by the user; and (iii) the destination URL.

In accordance with a first result of the present invention, a destination website access system provides simplified accessing by a PC user of a unique destination website through a remote Internet service provider (ISP), where the address of the unique destination website is embedded within a visibly displayed bar code on a visible medium or publication, article, advertisement, and the like. The user's PC has previously been equipped with a software program in accordance with the present invention for monitoring information received from a bar code reader or scanner. The bar code optical scanner is provided for reading the bar code and providing bar code output information indicative of particular words or intelligence embedded within the bar code, i.e., (i) a start word or initiating sequence; (ii) a destination website address associated with the particular publication; and (iii) publication source information.

As an example, a user reading the New York Times may notice an advertisement for a Mercedes™ automobile and desires further detailed information about the automobile including, again by further example, technical data; pricing; dealer names and locations, and communication numbers. A bar code on the Mercedes™ advertisement thus would contain information representative of (i) a "start" word(s) or command for the PC; (ii) a destination website address for the supplemental Mercedes™ information; and (iii) source information identifying the specific issue of the New York Times™ containing the Mercedes™ advertisement.

In order to access the supplemental Mercedes™ information, the PC user has a computer or workstation operable for (i) executing a website express application program; (ii) receiving the bar code scanner output information; and (iii) cooperatively detecting an initiation sequence or start word and temporarily storing at least one destination website address word. Upon detecting the start word, the website express application program establishes a communication link between the workstation and the ISP. In turn, a browser application program establishes a communication link between the workstation and the destination website corresponding to the destination website address.

A second key result of the present invention is that the website express accessing system is operable for transferring additional information to an intermediary website, including, but not limited to (i) the identity of the computer user; (ii) the specific publication on which the bar code was imprinted; and (iii) the destination URL.

Thus, the simple action of scanning the bar code with a scanner connected to a pre-programmed PC causes five things to occur: first, the special program starts the user's Internet browser application; second, it dials in to the user's Internet Service Provider (ISP); third, it causes the browser to automatically log into the intermediary website; fourth, logged into the intermediary website, information about who logged in, the publication the code was taken from, and the destination URL is captured and stored; fifth, the URL information is decoded and the user is linked to the desired website as identified in the publication.

The phrase "intermediary website" in the preceding paragraphs is used to describe a website controlled by an organization which has provided the aforesaid software program, herein referred to as the website express application program, and which is organized to collect and store the above-described captured and stored information.

To clarify, a company or other entity (hereinafter "Company") could arrange for the intermediary website and provide to the PC user the aforesaid software program. The PC user is free to use the program with a bar code reader to obtain information from selected websites, as aforesaid. The Company may use the information collected and stored at the intermediary website as aforesaid.

The benefit to the user is a much-simplified and more rapid method of gaining access to websites, the addresses of which they may find printed in advertisements or articles. Four steps, now performed manually by the user, are reduced to one step. Currently, the user will start the Internet browser, initiate the dial-in procedure, log in to the ISP and type in the address of the website they wish to view. In addition to the simplicity of use, this system increases the accuracy by removing the potential for mis-typed URLs which would prevent the user from gaining access to the site if he or she is off by even one character. The benefit to the publisher, author, or other third party, e.g., the Company, is the ability of this system to record "accesses" to websites whose addresses appear in the publication. This provides crucial but previously unavailable information regarding those who view the printed information and take the next step to view additional information in the website.

BRIEF DESCRIPTION OF THE DRAWING

FIG. 3 is a flow diagram in accordance with the present invention.

DETAILED DESCRIPTION OF THE INVENTION

Figure 1:
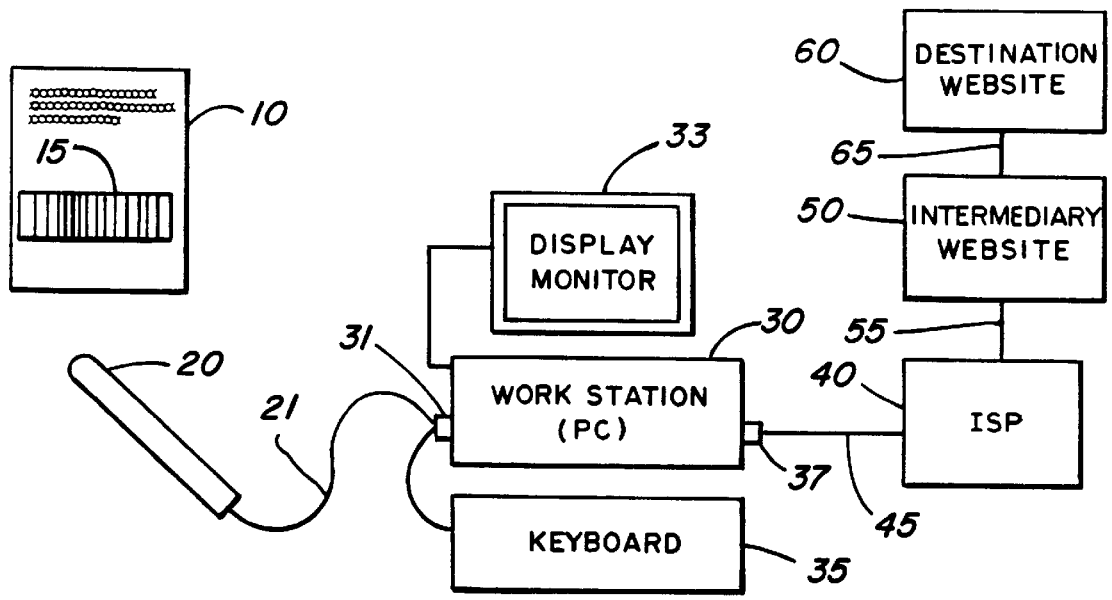
FIG. 1 is a schematic block diagram of the destination website access system according to the present invention.

Referring to the schematic block diagram of FIG. 1, threshown is the destination website access system in accordance with the present invention. By way of example, there illustrated is a visual publication 10 in the form of a printed advertisement or article which may be part of a broader collection of advertisements and articles in a published magazine or other publication. For example, printed article 10 may be an article relating to the United States Patent & Trademark Office published in the Wall Street Journal. In the following exposition, "publication" is intended to refer to any visual medium which contains information, and may include printed information or electronically displayed information. In the following exposition, publication 10 is intended to represent, among others, any unique article, advertisement, story, any visible display of information, or the like, and may be a single entity, or refer to the collection of the entities in a publication source, e.g., the magazine, newspaper, book, and the like.

Associated with publication 10 is a unique bar code 15 printed therewith. Although only one publication is shown in the drawing, it should be understood that associated with each unique publication is a unique bar code 15. Furthermore, as aforesaid, publication 10 also refers to any visual media, i.e., that which may be optically scanned, including but not limited to both the visual and infrared spectrums.

As used herein, bar code 15 is intended to represent those bar codes similar to those which are well-known in inventory and pricing systems as commonly found in the retail industry, for example, grocery store checkout systems. As is well known, such bar codes contain information about a particular product. An optical scanner may then be employed to read the bar code, and generate digital signals defining digital words for subsequent signal processing and computer operations which may be utilized, for example, product pricing at checkout and inventory control, as is well known.

Examples of applications and types of a bar codes are shown in U.S. Pat. No. 5,299,026, entitled, "Tracking the Reproduction of Documents On A Reprographic Device", issued to Vincent, et al; and U.S. Pat. No. 5,496,071, entitled, "Method of Providing Article Identity On Printed Works", issued to Walsh. Both of these patents employ bar codes on a printed publication, and further illustrate that embedded within bar code 15 may be one or more words as is well known. U.S. Pat. No. 5,288,976, entitled, "Bar Code Use In Information Transactional And Other System And Service Applications", issued to Citron, et al; and U.S. Pat. No. 5,528,025, entitled, "Apparatus and Method For The Wireless Exchange of Bar Code Data", issued to Swintek, illustrate the use of a computer/processor, bar code scanner, and corresponding interface for performing predetermined functions.

Figure 2:
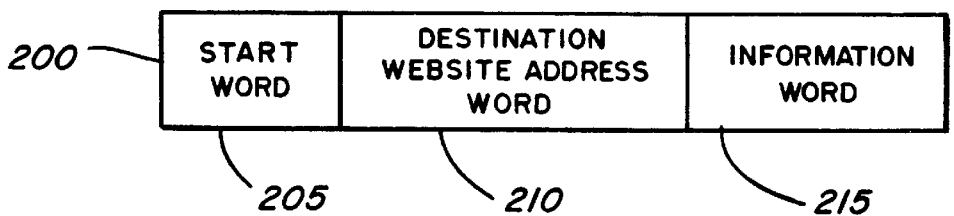
FIG. 2 is a diagrammatic representation of decoded information embedded within a bar code.

In one embodiment of the invention, embedded within bar code 15 are at least two words or components as particularly Illustrated in the diagrammatic representation 200 of FIG. 2. Of course, bar code 15 may include many other words. Bar code 15 is intended to be one of standard protocol so that bar code 15 may be decoded by scanner 20 to produce a series of digital words in the usual manner. In accordance with the present invention, bar code 15 is intended to be sufficient to establish at least a start word 205 and a destination website address word 210. Further, bar code 15 may also contain additional information words 215, for example, information descriptive of the actual publication or publication source (e.g., the magazine, itself). The start word may, for example, be a string of three characters.

Again referring to FIG. 1, thereshown is an Internet interface system illustrated as a personal computer (PC) or workstation 30 and accompanying display monitor 33 and keyboard 35. Coupled to workstation 30 is an optical bar code scanner 20. Scanner 20 is coupled to workstation 30 by means of connecting cable 21 coupled to input port 31 of workstation 30, which may also be shared with keyboard 35.

Workstation 30 includes a telephone input/output port 37 adapted to be connected to an ordinary telephone cable 45, which also represents the local telephone line. In turn, through telephone routing in the usual manner, telephone line 45 is ultimately coupled to an ISP 40 which forms, in part, the overall Internet system as is well known. In turn, in accordance with the World Wide Web protocol, ISP 40 is coupled to an intermediary website 50 through the Internet information coupling 55.

Before proceeding, it should be understood that intermediary website 50, having a unique website address, is a unique one of millions of possible websites which may be connected or linked to workstation 30 through the ISP 40. As was described earlier, the browser application program has the capability of sending the requested URL connection, namely the address or URL of intermediary website 50, as understood in the art. Likewise, destination website 60 is intended to represent a unique website having a unique website address, and represents only one of millions of possible destination websites on the Internet. As will be further explained, in accordance with the present invention, destination website 60 represents only that website address matching that of destination website address 210 embedded within the particular bar code 15 associated with a unique publication 10.

In the explanation and detailed description of the invention which follows, it should be noted that details of computer programming and corresponding details of the workstation digital signal processing and computer/microprocessor signal flow and interrupts have been omitted so as to not obfuscate the present invention. More specifically, in the following exposition, it will be assumed that workstation 30 is capable of simultaneously running or executing several application programs as is common in a Microsoft Windows 95™-like environment.

Furthermore, as is well understood, workstation 30 is simultaneously capable of receiving inputs from multiple sources, including, but not limited to, a "mouse", keyboard 35, scanner 20, and other peripheral devices all of which may provide digital input signals which may be translated or converted to more or less have the appearance of the common computer keyboard.

Referring now to each element of the aforedescribed system in detail, each unique bar code 15 associated with each unique publication 10 contains, at least, coded information describing both identification of the publication 10 upon which the bar code 15 appears, and a specific destination URL or destination website address, for example that which identifies destination website 60, and other coded information as desired, for example, the identity of the publication source (e.g., the magazine or newspaper).

Reference is now made to the flow diagram of FIG. 3 and the schematic block diagram of FIG. 1. In accordance with the present invention, workstation 30 includes a at least (i) a communication dialing program for linking the workstation 30 with the ISP 40, (ii) a browser application program, BAP, for communicating with the ISP and the world-wide web, and (iii) a website express application program, WEAP, each of which will be described in further detail below.

The communication linking or dialing program is intended for initiating a communication link with an ISP, for example ISP 40. In essence, the communication dialing program accesses a telephone communication modem, or the like, so as to establish a telephone communication link with ISP 40. This communication link, as is well understood in the art, is of a particular protocol of bits in a word, bit rate, and like so that workstation 30 and ISP 40, or any other ISP, may send and receive data back and forth through communication link 45.

The Internet browser application program is essentially a translator from a user friendly "windows-like" environment on the workstation so as to communicate with the Internet in accordance with established world wide web Internet protocol, e.g., employment of hyper text transfer protocol, i.e., "http".

In accordance with the present invention, the website express application program, "WEAP," when executed, is intended to perform functions as particularly illustrated in the flow diagram of FIG. 3. More particularly, in accordance with the present invention, the website express application program is intended to execute several software program components depending upon particular external stimulus, and more importantly the scanner output information of scanner 20 provided as input to input port 31. More specifically, the website express application program, upon execution, is intended to (1) initiate a browser application program; (2) initiate a dialing program to establish a link between the workstation 30 and the ISP 40; (3) establish a connection between the workstation 30 and intermediary website 50; (4) transfer to the intermediary website 50 selected information including the destination website associated with the scanner output information and corresponding publication 10 and bar code 15, selected unique user information, and publication source information, and (5) establish a connection between workstation 30 and destination website 60.

Referring more particularly to FIG. 3, box 300 signifies that the user has initiated the website express application program (WEAP), and that it is now resident on the user's workstation 30. Immediately after WEAP is executed, the WEAP will first initiate locating (where stored in the workstation memory) the browser application program, hereafter BAP, (boxes 305, 307 and 309). Box 309 represents that the website application program is now resident or running on the user's workstation which may be indicated by a display window or the like on the user's monitor 33.

WEAP will remain in an idle condition, indicated by box 310, awaiting an input from scanner 20. In this state, the WEAP is waiting for a stimulus from the scanner 20, namely, the required initiation sequence or start word 205 contained in a scanned bar code. Upon recognition of the appropriate start word, the remaining words contained within bar code 15 are intended to be temporarily stored in the computer's memory (not shown), including the destination website address 210, and other words 215, for example, publication identification (e.g., the name of the article) and publication source information (e.g., the publisher).

Secondly, after the start word 205 is detected, the WEAP verifies that an ISP link has been established, box 320. If not, an ISP link is established, box 330. Thirdly, the WEAP verifies that a browser application program has been initiated or executed, box 340. If not, the browser application program is initiated or executed, box 345.

In accordance with the present invention, the browser application program is intended to establish an Internet connection with intermediary website 50 in accordance with a predetermined website address stored as part of the BAP, as is indicated by box 350 of FIG. 3. Once the intermediary website 50 connection has been established, selected information is transferred to the intermediary website 50 as aforesaid, and the information is stored at the Intermediary website. More specifically, the destination website address 210, publication source information 215, as well as selected user information is transferred to the intermediary website 50 storage (not shown) as is indicated by box 360).

The website express application program in accordance with the present invention has been described herein to execute a variety of functions including establishing links with the ISP, the intermediary website, and the destination website, as well as controlling internal workstation operations for receiving inputs from scanner 20, displaying information on monitor 33, and the like. The actual details of the website express application program for both cooperating with and controlling workstation 30 are dependent upon the protocols of the workstation, i.e., the operating system or environment, and also the protocols of the telephone dialing modem, and specifically the browser application program.

Commonly, publishers of software, and more specifically the operating system software for the workstation or computer 30, and the browser application program (BAP), generally provide a "developers tool kit" which outlines the required protocols for other software to interface therewith and provide new and useful functions. In accordance with the present invention, these software protocols set by both the operating system publisher and browser application program publisher determine specifically how information received by the scanner 20 and inputted into the workstation 30 is entered as information into the specific software subroutines for execution of particular functions, e.g., dialing the modem and making the ISP link, more specifically, moving and processing digital words into input locations of particular software subroutines.

Another example of similar software requirements is the cooperating relationship between the so called 'shell" techniques of the windows environment to perform certain functions. These software protocols and details which are well understood in the art have been omitted in the explanation which follows in order not to further obfuscate the present invention.

It should be noted that the selected user information may be obtained by a variety of techniques including among others, user information required at the time of installation of the website express application program, the user's e-mail address, and the like, all of which are generally stored as part of the BAP and workstation 30.

In the preferred embodiment of the invention, after user information has been transferred to the Intermediary website 50, control is transferred over to the browser application program so as to establish an actual communication link with the destination website associated with the website address contained in word 210 of bar code 15 associated with the unique publication 10, as is indicated by box 365 in FIG. 3. After the communication link has been established with the destination website, box 370, information is displayed on the workstation monitor 33, as is indicated by box 375. At the discretion of the user, the user may then scan another publication, and in doing so, repeats the process as already described.

It should be appreciated by those skilled in the art that alternate arrangement of the execution steps illustration in FIG. 3 may be made without departing from the true spirit and scope of the present invention. More specifically, FIG. 3 shows that the ISP link is first made before the browser application is executed or checked. This of course may be reversed in order. Furthermore, the browser application itself in cooperation with the website express application program may establish the ISP link after first being executed. Furthermore, any of one of these program may also include the telephone dialing routine for operating the modem. Lastly, the website express application program may concurrently permit the browser application program to link with the intermediary website and the destination website as permissible in existing Netscape$^{SM}$ software where multiple windows are cooperating simultaneously for sending and receiving information. Lastly, a single website express application program may have all of these features and functions bundled into a single application program. These arrangements are also intended to be within the true spirit and scope of the present invention.

It should be appreciated that the invention as thus described obviates a need for visual inspection of a publication for determination of a corresponding URL and possible mis-typing during keyboard input thereof. The invention of the present application provides a destination website access system which permits rapid and simplified access to a destination website corresponding to a publication of interest without trial or error or laborious searching techniques.

In accordance with the present invention, the benefit to the user is a much-simplified method of gaining access to websites, the address of which is encoded in a bar code printed in the publication of interest. The four steps previously required, are now reduce to one, namely the scanning of a bar code on the publication.

In addition to the simplicity of use, the website express access system, in accordance with the present invention, increases accuracy by the avoidance of any need to copy and manually key input information through the keyboard into the workstation.

The website express access system in accordance with the present invention permits the recording of essential information crucial to the publication source. Namely, it permits the collection of information of those who have viewed a specific publication and took the "next" step in ferreting out even more information.

It will be appreciated by those skilled in the general art of computer information transfer that the present invention may be practiced by means of bar codes appearing on printed as well as electronic media, for example a television. The invention is, however, best suited for printed publications, such as magazines and newspapers.

It should also be appreciated that FIG. 1 has been illustrated with "hard" wire couplings of various components. These couplings may be provided alternately by means including, but not limited to, infrared or wireless couplings. The telephone connections could alternatively be provided by "cable" similar to that of the cable television and communication industry.

The foregoing has been described by way of discrete application program components, namely a dialing program, a browser application program, and a website express application program. It should be appreciated by the skilled in the art that all of these programs may be wrapped into a single program which may be resident on a workstation 30, and awakened by the scanner output similar to that already described.

The foregoing description of the invention is necessarily detailed so as to provide understanding of the invention's best mode of practice. It is to be understood, however, that various modifications of detail, rearrangement, addition, and deletion of components may be undertaken without departing from the invention's true spirit, scope, or essence.

More specifically, the unique coded information associated with a publication in accordance with the present invention has been shown herein to be provided by a common bar code. It should be recognized, that other visible information blocks may be employed. Therefore, the term "bar code" as has been used herein and recited in the claims which follow, represents any visible block of information contained with and associated with a specific visible publication which may be scanable by an electromagnetic scanner, including but not limited to, optical and magnetic scanners.

What is claimed is:

1. A destination website access system for accessing a unique destination website through a remote Internet service provider (ISP), where the address of the unique destination website is embedded within a visibly displayed bar code on a visible medium, said destination website access system comprising:

A) a bar code scanner for reading said bar code and providing bar code output information indicative of said bar code representative of at least a selected start word and a destination website address; and B) a workstation operable for:
  i) receiving said bar code scanner output information, and
  ii) executing a website express application program so that said workstation is operable for:
    a) monitoring said bar code output information,
    b) detecting said selected start word,
    c) establishing a communication link between said workstation and said ISP, and
    d) executing a browser application program component for establishing a communication link between said workstation and said destination website corresponding to said destination website address; and
    e) causing said browser application to establish a communication link with an intermediary website and transferred selected information associated with said workstation and said visible medium to said intermediary website.

2. The destination website access system of claim 1 wherein said selected information includes visible medium source information embedded within said bar code.

3. The destination website access system of claim 2 wherein said selected information is selectively stored and retrievable from said intermediary website, and said selected information includes:
   A) identity of the workstation,
   B) identity of said visible medium, and
   C) identity of said destination website.

4. A destination website access system for accessing a unique destination website through a remote Internet service provider (ISP), where (i) the address of the unique destination website; (ii) an initiation sequence start word; and (iii) publication source information are embedded within a visibly displayed bar code on a publication, said destination website access system comprising:
   A) a bar code scanner for reading said bar code and providing bar code output information indicative of said bar code; and
   B) a workstation operable for receiving said bar code scanner output information, and executing a website express application program operable for:
      i) establishing a communication link between said workstation and a predetermined intermediary website, and
      ii) establishing a communication link between said workstation and a destination website corresponding to said destination website address.

5. The destination website access system of claim 4 wherein said website express application program is further operable for transferring information associated with said workstation to said intermediary website.

6. The destination website access system of claim 4 wherein publication source information is embedded in said bar code and said website express application program is further operable for transferring said publication source information embedded within said bar code to said intermediary website.

7. The destination website access system of claim 4 wherein at least one of the following items of information is stored at (and retrievable from) said intermediary website:
   A) identity of workstation;
   B) identity of said visible medium; and
   C) identity of said destination website.

8. A method of accessing a unique destination website from a workstation through a remote Internet service provider (ISP), where the address of the unique destination website is embedded within a visibly displayed bar code on a visible medium, the method comprising:
   A) scanning said bar code for obtaining bar code output information indicative of said bar code representative of at least a selected start word and a destination website address;
   B) inputting said bar code output information into a workstation operable for receiving said bar code scanner output information, and
   C) executing a website express application program operable for:
      i) monitoring said bar code output information and detecting a initiation sequence start word,
      ii) upon detecting said start word, establishing a communication link between said workstation and said ISP, and
      iii) executing a browser application program component for first establishing a communication link with an intermediary website and transferring selected information associated with said user and said visible medium to said intermediary website, and secondly establishing a communication link between said workstation and said destination website.

9. The method of claim 8 wherein the selected information associated with said user comprises:
   A) identity of workstation;
   B) identity of said visible medium; and
   C) identity of said destination website.

10. A computer-readable medium having computer-executable instructions for the method recited in claim 8.

11. A computer-readable medium having computer-executable instructions for the method recited in claim 9.

12. A computer data signal embodied in a carrier wave readable by a computing system and encoding a computer program of instructions for executing a computer process performing the method recited in claim 8.

13. A computer data signal embodied in a carrier wave readable by a computing system and encoding a computer program of instructions for executing a computer process performing the method recited in claim 9.

* * * * *